April 4, 1950     C. ASPEGREN     2,502,914
POWER TAKEOFF
Filed Dec. 15, 1945
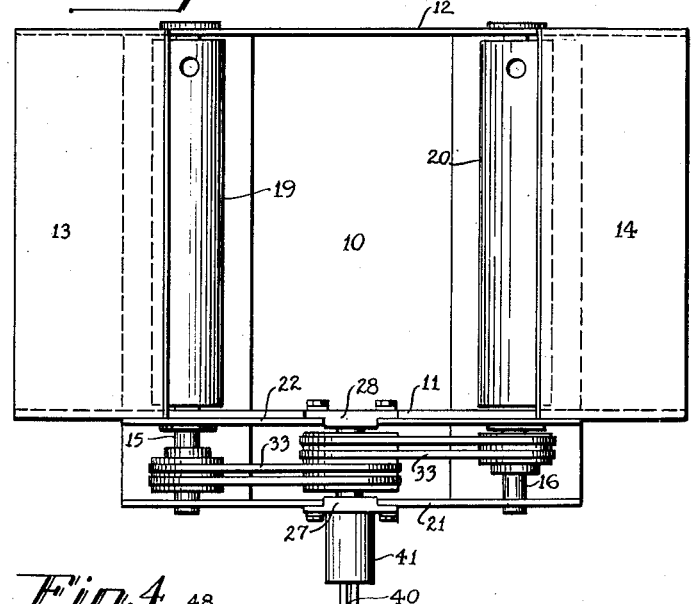
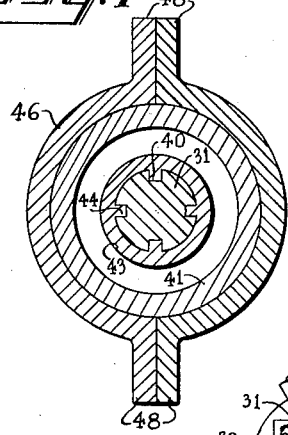
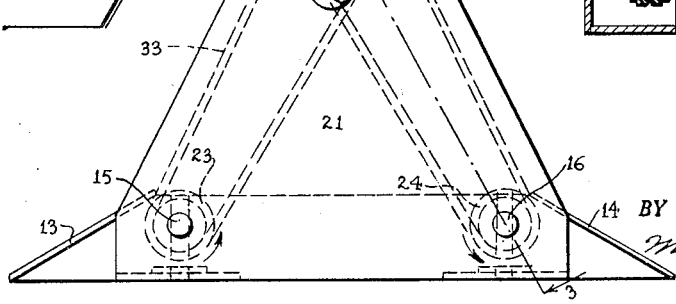
INVENTOR.
CARL ASPEGREN Patented Apr. 4, 1950

2,502,914

UNITED STATES PATENT OFFICE 2,502,914

POWER TAKE-OFF

Carl Aspegren, New York, N. Y.

Application December 15, 1945, Serial No. 635,169

4 Claims. (Cl. 74—14)

This invention relates to a power take-off device and has particular reference to a device for utilizing the power in the rear wheel of any automobile when disposed in a particular manner, for the purpose of driving and operating any one of several different forms and kinds of useful tools.

An object is to produce a simple, efficient, strong, economical device which can be used anywhere in connection with an automobile or other wheeled power driven vehicle for the purpose of utilizing the power of the vehicle when it is not in use as such.

A further object is to provide a device which requires the least effort and time to place it into association with the wheel of the vehicle and render it adaptable for transfer of power.

A still further object is to provide a device in which several tools can be interchangeably used with it and requires only a few seconds time to change from one tool to another.

Further and more specific objects, features and advantages will more clearly appear from the specification hereinafter especially when taken in connection with the accompanying drawings which illustrate a present preferred form which the invention may assume and which forms part of the specification.

In brief and general terms the invention includes a base frame on which are disposed a pair of rollers spaced apart on which the wheel of a power-driven vehicle such as an automobile is adapted to rest and to drive the rollers. A vertical frame is disposed in association with the base frame and the roller shafts extend thereinto. A tool shaft is supported on its own frame at the top of the vertical frame and is adjustably slidable thereon and adjusted by means of cams on the vertical frame. Connections such as belts extend between such means as pulleys on the roller shafts and the tool shaft to transmit power from the rollers to the tool shaft. The tool shaft is splined with keyways to receive keys on a tubular element extending from a suitable tool to drive the same when the two are engaged. A sleeve on the tool frame acts as a bearing surface for a collar laterally projecting from the tool to hold the parts securely in operative relation when engaged.

The present preferred form which the invention may assume is illustrated in the drawings, in which, Fig. 1 is a plan view of the device;

Fig. 2 is a side elevation of the device;

Fig. 3 is a vertical cross section taken on the line 3—3 of Fig. 2; and,

Fig. 4 is a vertical cross section taken on the line 4—4 of Fig. 3.

The device includes a base frame comprising a base plate 10, side plates 11 and 12 and end ramp plates 13 and 14. Rotatably supported between side plates 11 and 12 are shafts 15 and 16 suitably provided with ball bearing elements 17 and 18. Between the side plates 11 and 12 and supported on the shafts 15 and 16 are rollers 19 and 20 which are rigidly connected to these shafts in any desired manner. These rollers are spaced apart on the base frame and are preferably respectively disposed adjacent the upper ends of the ramps 13 and 14. On these rollers when the device is in use is disposed a rear wheel of an automobile so that when the engine thereof is started, the wheel, through the action of the usual differential in the car, will rotate and rotate the rollers 19 and 20 and therefore the shafts 15 and 16.

Associated with the base frame is an upright frame member comprising spaced vertical plates 21 and 22. Preferably the upright frame thus formed is disposed at one side of the base frame and the ends of the shafts 15 and 16 extend into the upright frame between the plates 21 and 22 as shown. On these ends of the shafts 15 and 16 are disposed preferably grooved pulleys 23 and 24. At their upper ends the plates 21 and 22 are provided with vertical slots 25 and 26. Slidably disposed in said slots are a pair of supporting plates 27 and 28 provided with ball bearing elements 29 and 30 to rotatably receive a shaft 31. Between the supporting plates 27 and 28 and on the shaft 31 is rigidly fixed a grooved pulley 32.

The pulley 32 and the pulleys 23 and 24 are connected by any suitable power-transmitting elements such as V-belts 33. The supporting plates 27 and 28 which form a vertically adjustable frame for the shaft 31 and pulley 32 are vertically adjustable in the slots 25 and 26 by means of a pair of cams 34 and 35 mounted on the ends of a shaft 36 which may be rotated by means of a handle 37. These cams are disposed respectively just below the lower edges of the plates 27 and 28. After these plates are thus adjusted they may be fastened in adjusted position by tightening up on bolts 38 connected to the plate 21 and extending through slots 39 in the plate 27. A similar series of bolts and slots are provided for the rear plate 28. Thus it can be seen that the tension in the transmitting belts 33 may be easily maintained at a desired value by the simple adjusting means.

It will be noted that the shaft 31 supported between the vertically adjustable plates 27 and 28 extends beyond the plate 27 and that this extended end portion is splined or provided with keyways 40. Fastened at its rear end to the plate 27 is a bearing sleeve 41 which as shown surrounds the splined end of the shaft 31. It is clear therefore that when the rear wheel of an automobile is run up the ramps 13 and 14 and rests upon the rollers 23 and 24 it will, when rotated operate these rollers and through the connections above described will drive the splined end of the shaft 31. It is one object of this invention to utilize this driven shaft to operate any number of elements such as belts, pulleys, grinding wheels, centrifugal pumps, and the like. To that end it is necessary that these devices be connected to the shaft in a detachable manner so that one element to be driven can be readily removed and replaced at will by another when desired. In the form shown in the drawings the element which is detachably connected to and supported on the shaft 31 is a rotary pump element 42 which has a hollow tubular sleeve 43 projecting laterally therefrom and provided with inwardly projecting tongue or keys 44 adapted to engage with the keyways 40 on the shaft 31. The pump element 42 is also provided with a plurality of arms such as 45 extending from its side to be connected to a collar member 46 having an inner shoulder 47. The collar member 46 surrounds the bearing sleeve 41 and rotates thereon as a bearing surface. The shoulder 47 limits the inward movement of the collar 46 on the sleeve 41. The collar 46 may be as shown in Fig. 4 formed of separate plates having flanges 48 at top and bottom which can be bolted together, as by bolts 49. The replacement of one element such as 42 by another merely requires that the element 42 be drawn laterally away from the vertical frame which permits the keys to be moved out of the key ways and the collar from the bearing sleeve as above described.

In the operation of the device the proper element to be driven is attached to the shaft 31 by the interlocking engagement of the tube 43 thereof with the splined shaft 31 and the relative bearing engagement of the collar 46 with the sleeve 41. The remaining parts being related and connected as above described it is only necessary to run the automobile to a position where one of its rear wheels runs up one of the ramp plates 13 and 14 and rests on and between the rollers 23 and 24. The other rear wheel of the car may rest on the ground. Then the engine of the car is continued running and the differential action of the automobile mechanism will permit the wheel of the rollers 25 and 24 to revolve while the other wheel on the ground remains at rest. Thus the rollers 23 and 24 are rotated and through the connections above described will operate whatever element is to be driven for one purpose or another as the case may be.

While the invention has been described in detail with respect to a present preferred form which the invention may assume it is not to be limited to such details and form since many changes and modifications may be made in the invention without departing from the spirit and scope of the invention in its broadest aspects. Hence it is desired to cover any and all forms and modifications of the device which may come within the language or scope of any one or more of the appended claims.

What I claim as my invention is:

1. A power take-off device which comprises a base frame, a pair of spaced rollers mounted therein and adapted to receive power from the wheel of a vehicle resting thereon, a vertical frame associated with the base frame, a power-driven tool-supporting shaft, a frame on which said tool-supporting shaft is disposed, means connecting the tool-supporting shaft with the rollers, and means for adjusting the vertical position on the frame of the tool-supporting shaft, said means comprising a cam engaging said frame and adapted when turned to exert upward pressure against said frame.

2. A power take-off device which comprises a base frame, a pair of spaced rollers mounted therein and adapted to receive power from the wheel of a vehicle resting thereon, a vertical frame associated with the base frame, a power-driven tool-supporting shaft, a frame on which said tool-supporting shaft is disposed, means connecting the tool-supporting shaft with the rollers, means for adjusting the vertical position of the frame of the tool-supporting shaft, said means comprising a cam engaging said frame and adapted when turned to exert upward pressure against said frame, and means for detachably connecting a tool to said tool-supporting shaft.

3. A power take-off device which comprises a base frame, a pair of rollers mounted thereon and adapted to receive power from a wheel of a vehicle resting thereon, said rollers having shafts, a vertical frame member disposed adjacent the base frame, the ends of said shafts extending into said vertical frame, a tool-supporting shaft, said shaft being mounted in a pair of spaced blades, a frame on which said tool-supporting shaft is disposed, said last mentioned frame being disposed at the top of the vertical frame, means for adjusting the tool-supporting shaft frame on the vertical frame, said means comprising a cam mounted on the vertical frame and engaging one of said plates, connections between the tool-supporting shaft and the shafts of the rollers, and means for detachably connecting a tool to the end of the tool-supporting shaft.

4. A power take-off device which comprises a base frame comprising side plates and a bottom plate, rollers disposed in spaced relation between said side plates, a vertical frame disposed at one side of said base frame and comprising spaced vertical plates, said rollers having shafts extending into the vertical frame between its side plates, pulleys on the ends of said shafts, a tool-shaft supporting frame disposed at the top of the vertical frame, means whereby the last mentioned frame is vertical slidable on the vertical frame, cam means on the vertical frame and associated with the tool-shaft supporting frame to vertically adjust it thereon, a pulley on said tool shaft, connections between the pulley on the tool-shaft and the pulleys on the roller shafts, said tool-shaft extending laterally from its supporting frame, and means for detachably supporting a tool on said shaft.

CARL ASPEGREN.

REFERENCES CITED

The following references are of record in the file of this patent:

UNITED STATES PATENTS

| Number | Name | Date |
| --- | --- | --- |
| 306,560 | Vande Water | Oct. 14, 1884 |
| 776,170 | Burkhardt | Nov. 29, 1904 |
| 1,187,710 | Church | June 20, 1916 |
| 1,708,903 | Schroder | Apr. 9, 1929 |
| 1,850,350 | Jackson | Mar. 22, 1932 |
| 2,197,926 | Dunham | Apr. 23, 1940 |
| 2,283,348 | Adams | May 19, 1942 |

FOREIGN PATENTS

| Number | Country | Date |
| --- | --- | --- |
| 25,817 | Australia | Dec. 24, 1935 |
| 464,245 | France | Mar. 16, 1914 |
| 691,452 | France | Oct. 22, 1930 |
| 705,040 | France | May 29, 1931 |